United States Patent [19]

Strickland

[11] Patent Number: 5,111,988

[45] Date of Patent: May 12, 1992

[54] FLEXIBLE AUTOMATED BODY ASSEMBLY SYSTEM AND METHOD

[75] Inventor: William W. Strickland, Lake Orion, Mich.

[73] Assignee: Saturn Corporation, Troy, Mich.

[21] Appl. No.: 667,115

[22] Filed: Mar. 11, 1991

Related U.S. Application Data

[63] Continuation-in-part of Ser. No. 509,375, Apr. 16, 1990, abandoned.

[51] Int. Cl.$^5$ .............................................. B23K 37/04
[52] U.S. Cl. .................................... 228/102; 228/212; 228/4.1; 228/47; 219/161
[58] Field of Search .................... 228/4.1, 6.1, 44.3, 228/47, 102, 212; 219/79, 161

[56] References Cited

U.S. PATENT DOCUMENTS

| | | | |
|---|---|---|---|
| 4,162,387 | 7/1979 | DeCandia | 219/79 |
| 4,256,947 | 3/1981 | DeCandia | 219/79 |
| 4,400,607 | 8/1983 | Wakou et al. | 219/86.8 |
| 4,442,335 | 4/1984 | Rossi | 219/79 |
| 4,494,687 | 1/1985 | Rossi | 228/47 |
| 4,667,866 | 5/1986 | Tobita et al. | 228/4.1 |
| 4,682,722 | 7/1987 | Bossotto et al. | 228/41 |
| 4,856,698 | 8/1989 | Marianne et al. | 228/4.1 |
| 4,893,398 | 1/1990 | Zimmer | 29/568 |
| 4,905,884 | 3/1990 | Alborante et al. | 228/4.1 |

FOREIGN PATENT DOCUMENTS

1-175582 7/1989 Japan.

Primary Examiner—Samuel M. Heinrich
Attorney, Agent, or Firm—Charles E. Leahy

[57] ABSTRACT

A body welding station receives a succession of differing body component parts in order to weld such component parts into an integrated body structure of differing styles. A fixture frame has clamping and locating fixtures mounted thereon by disconnectable fixture holding devices which permit the individual and selective removal of certain of the fixtures from the fixture frame and permit the mounting of different fixtures thereon for the subsequent clamping and locating of body components for a body structure of different style. A fixture changing station is located remote from the welding station and has associated fixture storage apparatus storing additional fixtures therein. A transport apparatus moves the fixture frame between the welding station and the fixture changing station. A programmable fixture changing robot is adapted to individually disconnect certain of the fixtures from the fixture frame and then mount different fixtures thereon so that the fixture frame may be returned to the welding station for fixturing of the next of the successive body structures to be welded therein. The fixtures may have electrical and fluid power sensors and clamping apparatus associated therewith, in which case the fixture holding devices includes disconnectable electrical connectors and fluid power connectors adapted to mate with mating connectors mounted on the fixture frame to communicate control and power signals between the fixture frame and the particular fixture mounted on the fixture frame.

5 Claims, 8 Drawing Sheets

FLEXIBLE AUTOMATED BODY ASSEMBLY SYSTEM AND METHOD

This is a continuation-in-part of application Ser. No. 07/509,375 filed Apr. 16, 1990 now abandoned.

The invention relates to a system for welding together vehicle body components and more particularly provides a fixture frame having clamping fixtures disconnectably mounted thereon for automated exchange by a programmable fixture changing robot so that a single fixture frame may be employed to fixture two or more different vehicle body styles.

BACKGROUND OF THE INVENTION

Motor vehicle bodies are conventionally assembled from stamped sheet metal component parts which must be held precisely in three dimensional space relative to each other while welds are applied to join the panels into an integral body structure. For example, the body structure may be a subassembly such as an underbody, a wheel house subassembly, a floor pan or a body side ring.

It is accordingly well known to provide a rigid rectangular fixture frame, also known as a gate, a pallet, or carrier, which carries a plurality of clamping fixtures for clamping and locating the various component parts in the precise required relationship in readiness for the application of welds.

In particular it is known to loosely assemble a plurality of such component parts via interlocking tabs. The loosely assembled components are then conveyed into a body framing and welding station in which various fixtures clamp and precisely locate the component parts for welding. It is well known to mount such fixtures on a gate or frame and to move such a gate away from the body after the application of sufficient welds to tack the components together, so that the robotic welders are given unrestricted access to apply a large number of re-spot welds to the vehicle body.

It is also well known to assemble vehicle bodies of varied styles, for example, a coupe, a sedan, station wagon, etc. on the same body assembly system. Accordingly, the prior art has taught the provision of a gate or frame corresponding to each of the body styles and carrying the particular fixtures for that body style. Various apparatus, such as shuttles, conveyors, lift and carry mechanism, turn tables, and automatic guided vehicles have been employed to remove one gate from the welding station and then move the appropriate gate or frame into the framing and welding station for enabling the welding of the particular body style entering the body framing and welding station.

A disadvantage of the aforedescribed prior art body assembly system is that the storage and handling of a plurality of gates requires substantial floor space and handling apparatus and may adversely impact the cycle time for the body assembly system.

It would be desirable to provide a body assembly system having improved flexibility for the welding of a large variety of different styles of vehicle bodies and body components.

SUMMARY OF THE INVENTION

According to the present invention, a body welding station receives a succession of differing body component parts in order to weld such component parts into an integrated body structure of differing styles. A fixture frame has clamping and locating fixtures mounted thereon by disconnectable fixture holding devices which permit the individual and selective removal of certain of the fixtures from the fixture frame and permit the mounting of different fixtures thereon for the subsequent clamping and locating of body components for a body structure of different style. A fixture changing station is located remote from the welding station and has associated fixture storage apparatus storing additional fixtures therein. A transport apparatus moves the fixture frame between the welding station and the fixture changing station. A programmable fixture changing robot is adapted to individually disconnect certain of the fixtures from the fixture frame and then mount different fixtures thereon so that the fixture frame may be returned to the welding station for fixturing of the next of the successive body structures to be welded therein. The fixtures may have electrical and fluid power sensors and clamping apparatus associated therewith, in which case the fixture holding devices includes disconnectable electrical connectors and fluid power connectors adapted to mate with mating connectors mounted on the fixture frame to communicate control and power signals between the fixture frame and the particular fixture mounted on the fixture frame.

Accordingly, the object, feature and advantage of the invention resides in the provision of a component fixture frame for a welding station having a plurality of disconnectable fixtures mounted thereon and selectively removable therefrom by a programmable fixture changing robot when the fixture frame is transported away from the welding station.

Another object, feature and advantage of the invention resides in the use of a single fixture frame to frame and weld differing body styles by individually robotically exchanging certain disconnectable fixtures for other fixtures to suit the next body to be welded.

Another object, feature, and advantage of the invention resides in the provision of a body assembly system including fixture frames having disconnectably mounted fixtures thereon with disconnectable electrical and fluid power connectors associated with fixture holding devices for automatic plug in type connect and disconnect.

BRIEF DESCRIPTION OF THE DRAWINGS

These and other features, objects and advantages of the invention will become apparent upon consideration of the appended description of the preferred embodiment and the drawings in which.

DESCRIPTION OF THE PREFERRED EMBODIMENT

Figure 1:
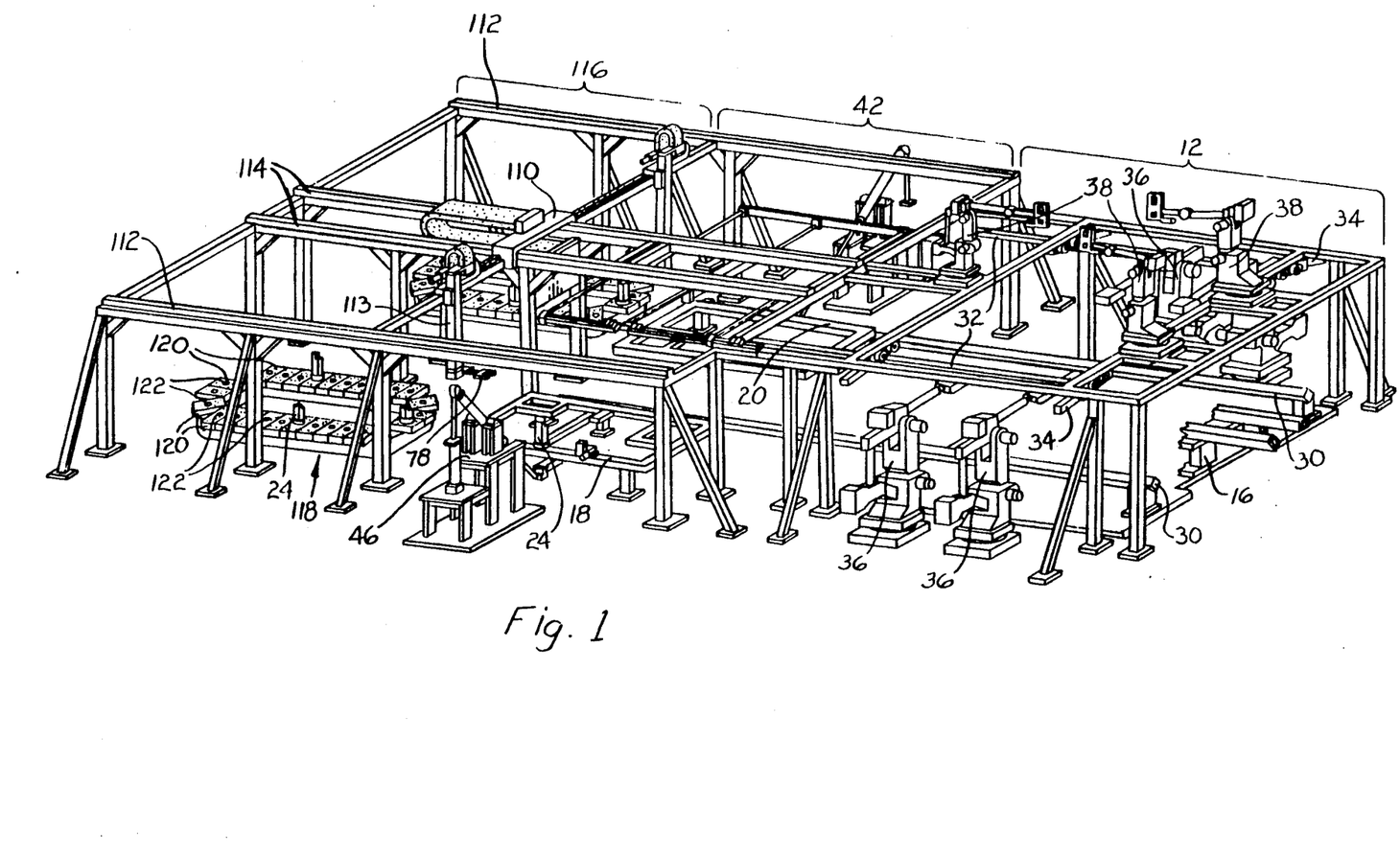
FIG. 1 is a perspective view of a body assembly welding system embodying the invention.
Figure 4:
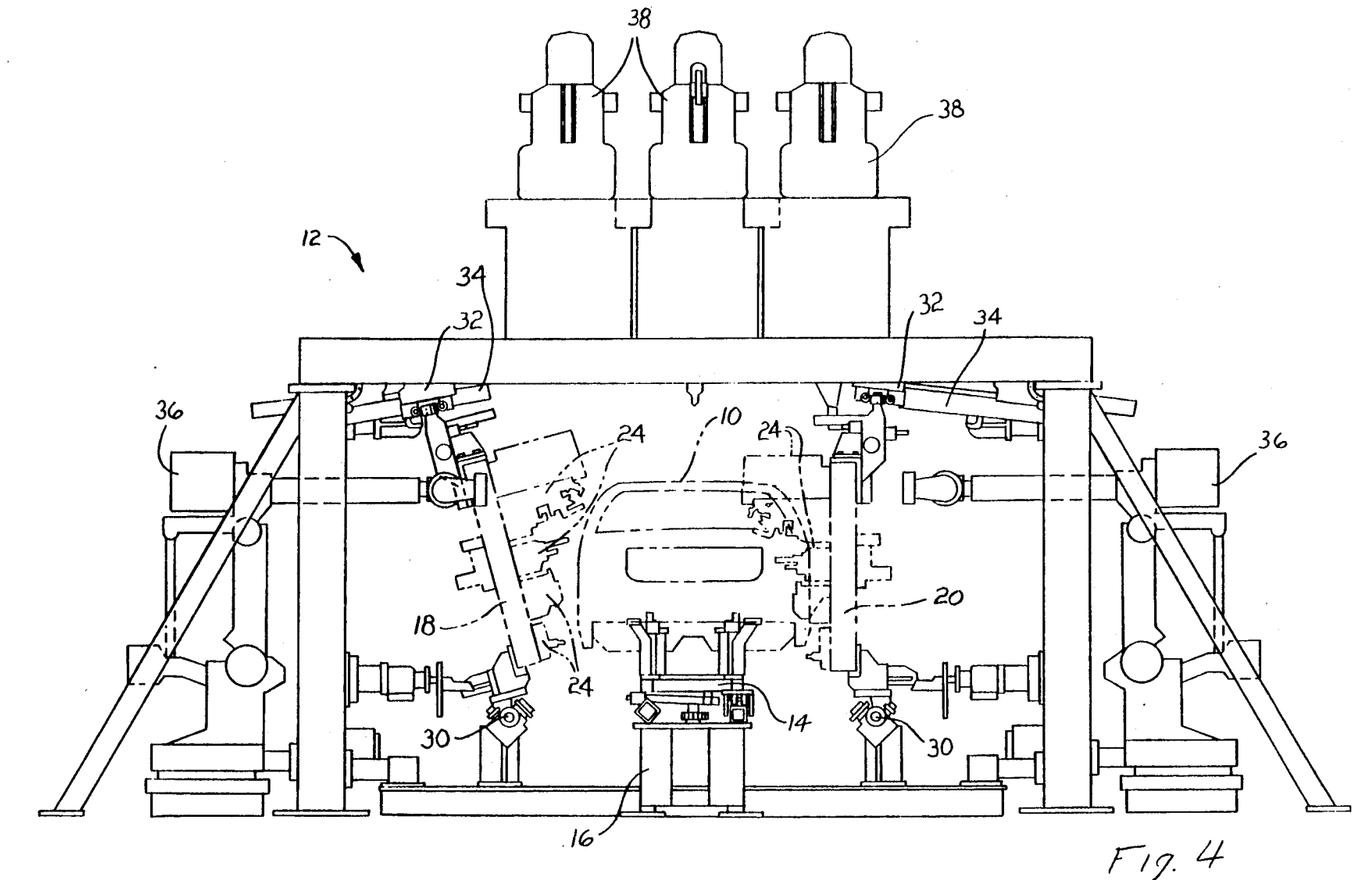
FIG. 4 is an end view showing the welding station with the fixture frame gate shown in phantom lines.

A vehicle body structure 10, shown in phantom line in FIG. 4 is assembled from a plurality of stamped component panels which are loosely connected by interlocking tabs. The loosely assembled body 10 enters the framing and welding station 12 of FIG. 4 on a body truck 14 riding on floor conveyor 16. The framing and welding station 12 is also shown in FIG. 1. The vehicle body 10 is a particular style, such as a coupe, sedan, station wagon, convertible or the like.

Side fixture frame gates 18 and 20 are positioned alongside the vehicle body 10 and carry a plurality of clamping and locating fixtures 24 for clamping and locating the component parts of the loosely assembled body 10. As best seen in FIG. 4, the gate 18 is mounted on a lower track 30 and an upper track 32 for travel in and out of the framing and welding station 12 as will be discussed hereinafter. Furthermore, at least a portion of the upper track 32 is movably mounted on a transverse track 34 so that the gate 18 may be pivoted inwardly from its FIG. 4 retracted position toward the vehicle body 10 to the working position occupied by the gate 20 of FIG. 4. It will be understood that the position obtained by the gate 20 will carry the various fixtures 24 into their respective clamping and locating positions with respect to the vehicle body 10 so that the various panels of body 10 will be precisely located and clamped in the readiness for welding. A plurality of floor mounted welding robots 36 and overhead mounted robots 38 each carry weld guns for welding the various body panels together in a preprogrammed cycle which corresponds to the particular body style of vehicle being welded. After approximately 30 seconds, the welding robots 36 and 38 retract to clear the framing and welding station 12. The gates 18 and 20 then unclamp their respective fixtures 24 from the vehicle body 10 and are retracted away from the vehicle body 10 from the working position of gate 20 to the retracted position of gate 18. Then gate 18 is transferred out of the framing station 12 on the gate transport tracks 30 and 32 in the left-hand direction as viewed in FIG. 1. Gate 20 is similarly transported out of the framing station. After these gates 18 and 20 and their respective clamps 24 are moved away from the vehicle body, the welding robots 36 and 38 continue re-spot welding for additional minutes to complete the welding of the vehicle body 10.

Figure 2A:
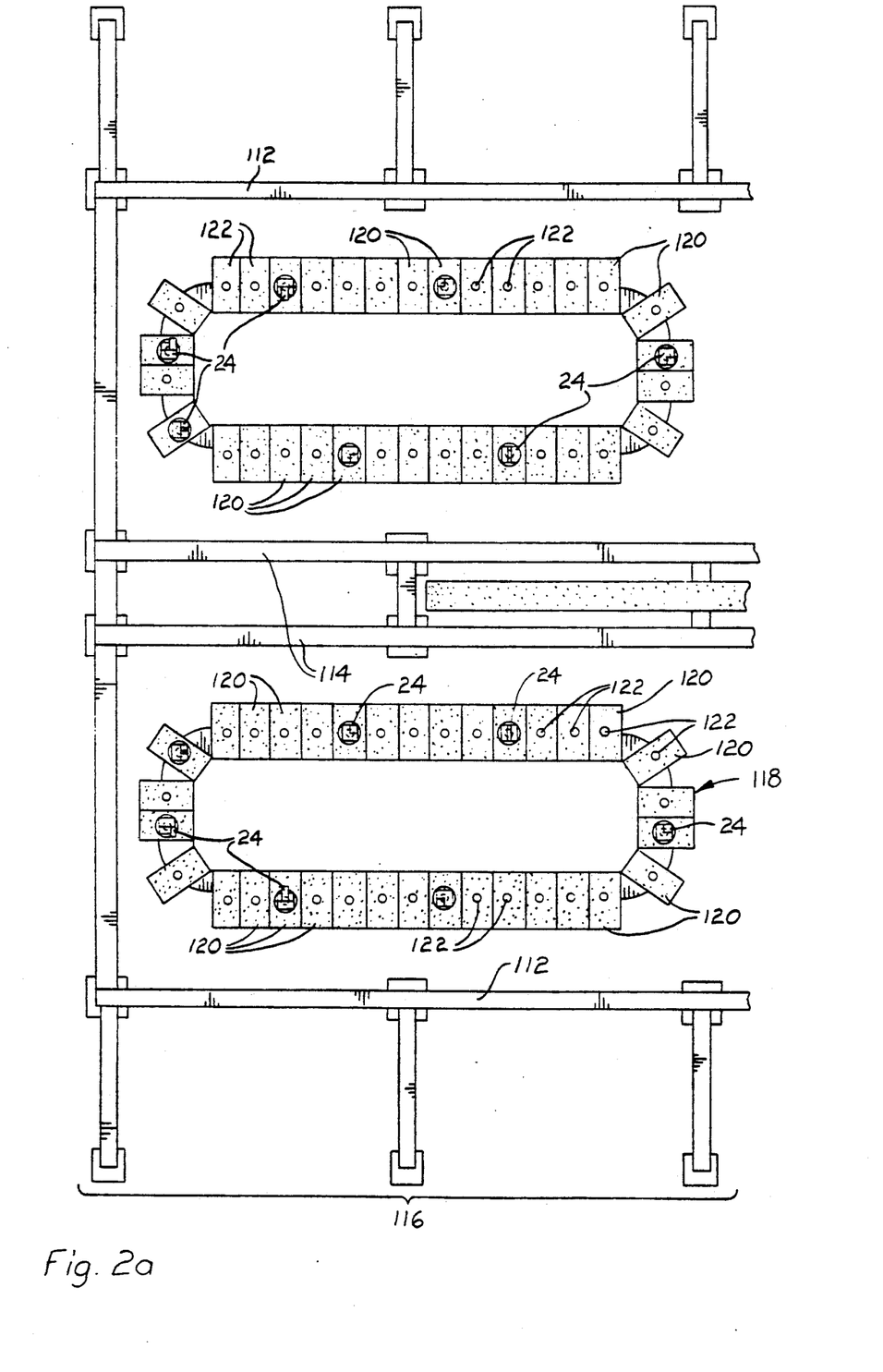
FIG. 2a is a plan view showing the carousel storage mechanism for storing various clamping and locating fixtures.
Figure 2B:
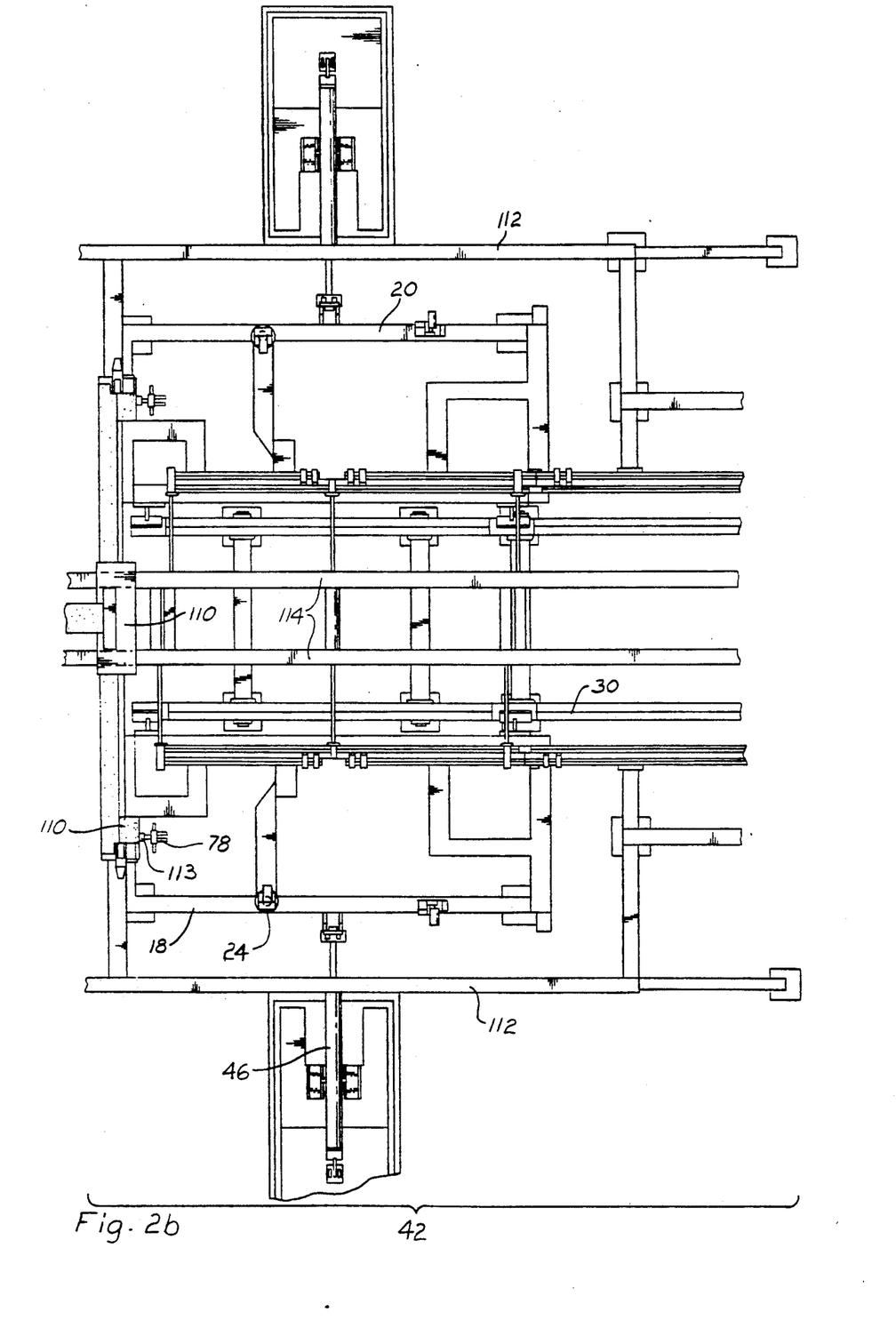
FIG. 2b is a plan view showing the fixture changing station in which a fixture changing gantry style robot retrieves fixtures form the carousel of FIG. 2a and installs the fixtures on the fixture frame gate.
Figure 3:
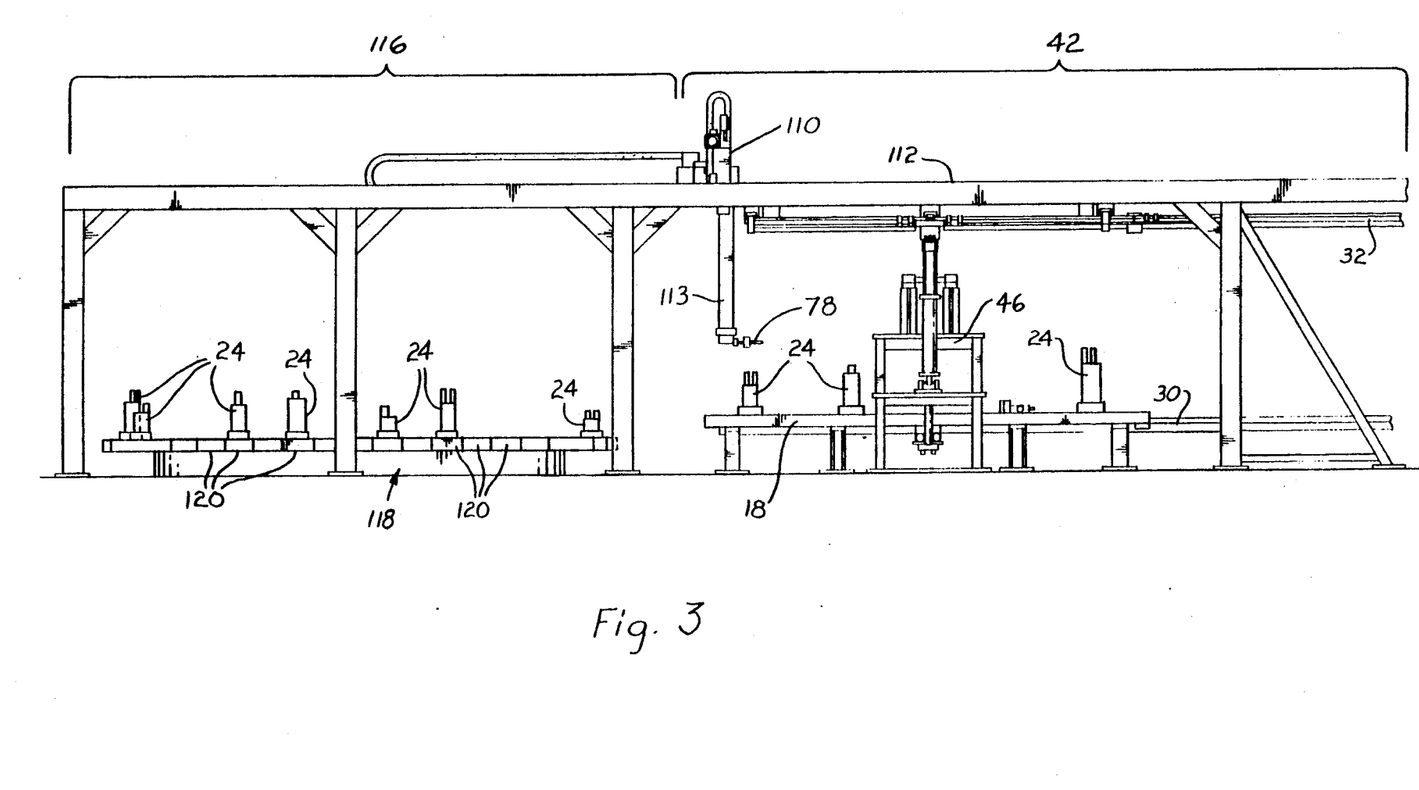
FIG. 3 is a side elevation view showing the fixture storage station of FIG. 2a and the fixture changing station of FIG. 2b.

While the robots are welding, the gate 18 is moved along the tracks 30 and 32 to the fixture changing station, generally indicated at 42, and shown in FIGS. 2b and 3. At the fixture changing station 42 the gate 18 is released from engagement with the upper track 32 and gripped by a lay down mechanism 46 which proceeds to pivot the gate 18 about the track 30 to a lowered horizontal position in which the various fixtures 24 are pointed upwardly as best seen in FIG. 3.

Figure 5:
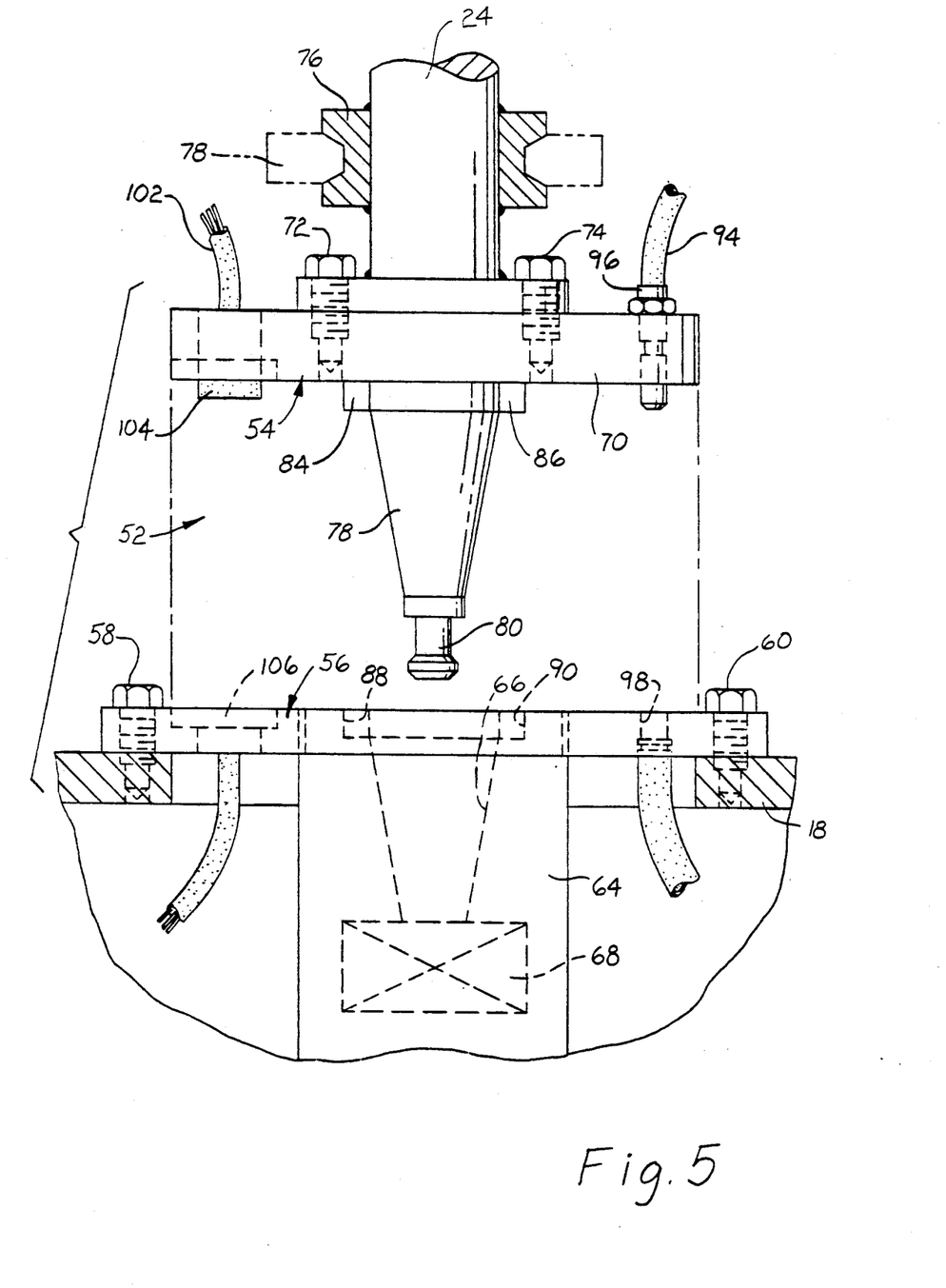
FIG. 5 is an exploded elevation view of the fixture holding device which disconnectably mounts fixtures on the fixture frame.

Referring to FIG. 5, it is seen that a typical fixture 24 is disconnectably attached to the tubular steel of the fixture frame gate 18 by a disconnectable holding device 52 comprised of a fixture holder 54 and a lock mechanism 56. The lock mechanism 56 is fixedly attached to the gate 18 by bolts 58 and 60 and includes a lock housing 64 having a conical tapered recess 66 with a locking collet 68 disposed at the bottom thereof.

Fixture holder 54 includes a plate 70 upon which the fixture 24 is mounted by bolts 72 and 74. The fixture 24 has a grip ring 76 welded thereto by which the gripper hand 78 of a fixture changing robot, to be discussed hereinafter, may grip the fixture 24 to manipulate the fixture holder 54. A tapered cone 78 projects from the underside of the plate 70 and is adapted to mate precisely within the tapered recess 66 of the lock mechanism 56. A lock pin 80 is carried at the apex of the tapered cone 78 and is locked by the locking collet 68 to positively lock the fixture holder 54 on the gate 18.

The fixture holder plate 70 has a pair of lock tabs 84 and 86 which project therefrom on opposite sides of the tapered cone 78 and interlock into mating recesses 88 and 90 on the lock housing 54 to lock the fixture holder 54 against rotation relative to the gate 18.

The fixture 24 includes hydraulic or pneumatic actuated clamping and locating devices which receive fluid power through a hose 94 attached to the plate 70 by a coupling 96. The coupling 96 plugs into and mates with a connector 98 mounted on the lock mechanism 56. In addition, the fixture 24 carries limit switches or other sensors which are connected to cable 102 having a connector 104. The connector 104 plugs into a connector 106 mounted on the lock mechanism 56. Accordingly, when the fixture holder 54 is engaged with the lock mechanism 56, the fluid couplers 96 and 98 are automatically coupled and the electrical connectors 104 and 106 are automatically coupled to establish electrical and fluid communication between the gate 18 and the fixture 24.

The disconnectable holding devices 52 are commercially available and are well known in the robotic industry, such holding devices are typically employed on the end of a robot arm to disconnectably mount tools on the robot arm. Manufacturers of such devices include EOA Systems, Inc., 15054 Beltway Drive, Dallas, Tex. and Applied Robotics, 301 Nott Street, Schenectady, N.Y.

Referring again to FIG. 3, it is seen that a gantry type programmable robot, generally indicated at 110, is mounted on gantry tracks 112 and 114 for movement above the gate 18. The gantry robot 110 includes an arm 113 which reaches down and carries the gripper hand 78 for gripping the fixtures 24.

Also shown in FIG. 3, as well as the plan view of FIG. 2a, is a fixture storage station generally indicated at 116. The fixture storage station includes a carousel storage mechanism, generally indicated at 118, and having a plurality of tool trays 120 each having a receptacle 122 for receiving the tapered cone 78 of one of the fixtures 24. As shown in FIG. 2a, a plurality of fixtures 24 are stored on the carousel 118. Furthermore, as seen in FIG. 2a and FIG. 3, the gantry tracks 112 and 114 for the gantry crane 110 extend overtop the carousel 118. In operation, the gantry crane 110 is programmed to remove a fixture 24 from the gate 18 and carry that fixture 24 to its storage location on the carousel 118 where the robot places the fixture 24 into the receptacle 122 of the appropriate tool tray 120. The carousel 118 is preferably motorized to rotate and carry the appropriate tool to a designated location in readiness for pickup by the hand 78 of the gantry crane 110. In addition, gantry crane 110 is programmed to remove from the gate 18 and only those of the fixtures 24 which need to be changed for the assembly of the next vehicle body 10 which will enter the framing and welding station 12.

After the appropriate fixtures 24 have been changed, the lay down mechanism 46 lifts gate 18 back into engagement with the upper track 32 and then the gate is transported back to the framing and welding station 12.

It will be understood that although the fixtures storage station 116 is shown herein as a carousel, the carousel may be replaced by a storage rack, shelves, turntable or other storage device. Furthermore, the movement of the gate 18 away from the framing station for exchange of the fixtures 24 may be provided by alternative devices such as rotating the gate on a turntable, lifting the frame vertically above the framing station, etc. In addition, it will be understood that although the preferred embodiment described here employs only a single fixture frame or gate 18 which interchangeably receives various fixture combinations, an additional one or more gates may be employed in order to decrease cycle time so that one gate can be in the framing station while the other gate is in the fixturing changing station.

DESCRIPTION OF THE SECOND EMBODIMENT OF THE INVENTION

Figure 6:
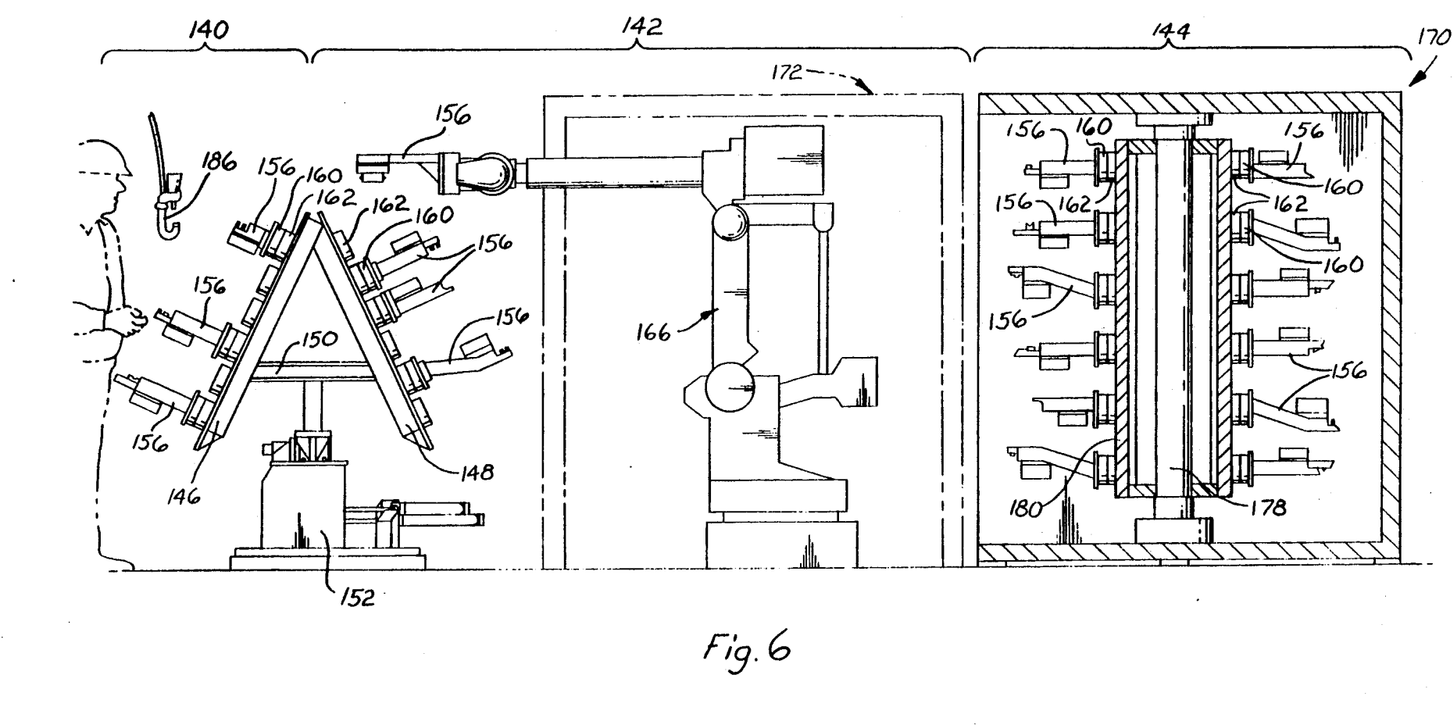
FIG. 6 is a side elevation view of a second embodiment of the invention for the assembly of various vehicle subassemblies.
Figure 7:
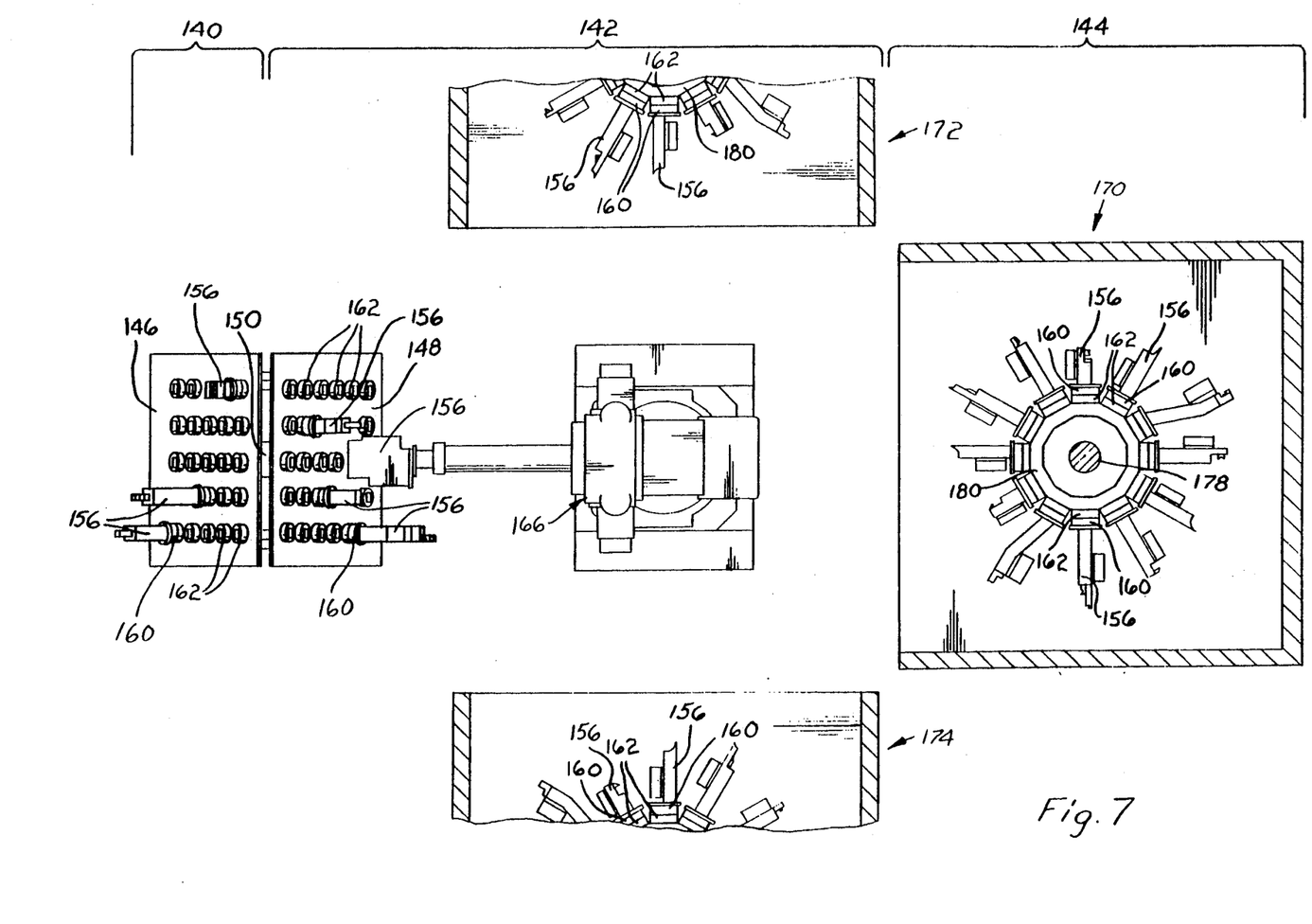
FIG. 7 is a plan view of the embodiment of FIG. 6.

Referring to FIGS. 6 and 7 a second embodiment of the invention is shown which is particularly suited for the welding together of small sheet metal stampings to comprise a subassembly of the vehicle body.

Referring to FIG. 6 it is seen that the second embodiment includes a welding station 140, a fixture changing station 142, and a fixture storage station 144. A pair of fixture frames 146 and 148 are mounted on a turntable 150 which is rotated by a motorized drive 152. The fixture frame 146 carries a plurality of fixtures 156. Each fixture 156 is disconnectably mounted on the fixture frame 146 by a disconnectable holding device comprised of a fixture holder 160 which is permanently mounted to the fixture 156, and a base 162 which is permanently mounted on the fixture frame 146. A locking mechanism, not shown, acts between the fixture holder 160 and the base unit 162 to mount the fixture 156 on the fixture frame 146, and yet permit the fixture 156 to be detached from the fixture frame 146.

The fixture frame 148 also carries fixtures 156 which are also detachably connected to the fixture frame 148 by disconnectable holding devices comprised of fixture holders 160 and base units 162.

A fixture changing robot 166 is provided for gripping the fixtures 156 and removing the fixtures from the fixture frames 146 and 148.

A plurality of fixture storage turntables generally indicated 170, 172, and 174 are provided for storing the fixtures 156. As seen in FIG. 7 the storage turntables, 170, 172 and 174 are of arrayed around the robot 166 so that the robot 166 can select fixtures 156 from any of the turntables.

The turntable 170 includes a vertical spindle 178 carrying a drum 180. The drum 180 carries a plurality of the base units 162 arrayed in rows and columns thereon so that the various fixtures 156 may be stored on the drum 180.

In operation, the operator loads selected stampings into the fixtures 156 carried by the fixture frame 146. After the stampings are properly located and clamped by the fixtures 156, the weld gun 186 is used by the operator to weld the panels together.

If the operator wishes to build different subassemblies by welding together different stampings, the motor unit 152 is energized to rotate turntable 150 so that the fixture frame 146 will be transported away from the assembler and toward the fixture changing robot 166. Simultaneously, the turntable will transport the fixture frame 148 and its fixtures 156 to the operator for use by the operator in welding the different subassemblies together.

Then, the robot, acting either in response to an order from the operator or in response to the programming of a master controller, will remove a fixture 156 from the fixture frame and store that particular fixture at its appointed storage location on one of the turntables 170, 172, or 174, and then retrieve a desired fixture from the turntables for installation on the fixture frame. In this manner the fixture frame may be reconfigured to provide the locating and clamping fixtures 156 which are needed for the assembly of the next assembly task to be undertaken by the weld operator.

It will be understood that the welding to be performed by the weld gun 186 can be performed by a robotically operated welder. In addition, it will be understood that the turntable 150 can carry a plurality of the fixture frames. For example, if the turntable carries three fixture frames, one frame can be positioned in alignment with the fixture changing robot 166 for fixture changing, another fixture frame may be facing an operator or a robot which loads or unloads the stamped parts or subassemblies, and a third fixture frame can be clamping and holding the subassemblies while the operator or welding robot is welding the panels together.

As best seen in FIG. 7, it will be appreciated that the fixture bases 162 are preferably arrayed on the fixture frames in a regular pattern of rows and columns to provide the maximum flexibility in fixturing parts for welded assembly. In this manner the mechanism can be readily reconfigured for performance of new welding operations by simply designing new fixtures for use in conjunction with the fixture frames 146 and 148.

Thus it is seen that the invention provides a new and improved assembly system for welding together sheet metal panels and having improved flexibility for the welding of a large variety of different styles of vehicle bodies and body components. This improved flexibility is obtained by the use of a fixture frame having the clamping and locating fixtures disconnectably attached thereto to permit robotic exchange of fixtures to reconfigure the fixture frame for the use in welding the next vehicle body or component to be assembled. It will be appreciated that the teachings of this invention may be employed in many vehicle welding operations and is not limited to the particular embodiments shown herein, but rather has broad application to the manufacturing industry. For example, the manufacturing flexibility obtained by the robotic exchange of fixtures can be readily adapted to many existing assembly systems as desired to increase the flexibility of such systems for use in manufacturing a larger variety of welded together panels.

The embodiments of the invention in which an exclusive property or privilege is claimed are defined as follows:

1. A body assembly system of the type having a welding station receiving a succession of differing body component parts to weld such components into integrated body structures of a different type, comprising:
    a fixture frame having a plurality of fixtures mounted thereon to clamp and locate the component parts in predetermined position within the welding station, welding means fixedly and immovably adapted to apply welds to the positioned component parts, disconnectable fixture holding means mounting said fixtures on the fixture frame and permitting removal of said fixtures from the fixture frame and permitting the mounting of different fixtures thereon for the subsequent clamping and locating of the body components for a different body structure, and programmable fixture changing robot means adapted to disconnect said fixtures from the fixture frame and mount different fixtures thereon for the welding of the next of the successive body structures to be welded.

2. A body assembly system of the type having a welding station receiving a succession of differing body component parts to weld such components into integrated body structures of a different type, comprising:

a fixture frame having fixtures mounted thereon to clamp and locate the component parts in predetermined position within the welding station, programmable welding robot means adapted to apply welds to the positioned component parts;

transport means for moving the fixture frame away from the welding station, disconnectable fixture holding means fixedly and immovably mounting said fixtures on the fixture of frame and permitting removal of said fixtures from the fixture frame and permitting the mounting of different fixtures fixedly and immovably thereon for the subsequent clamping and locating of the body components for a body structure of differing type, and programmable fixture changing robot means being located away from the welding station and adapted to disconnect said fixtures from the fixture frame when the transport means moves the fixture frame away from the welding station, and mount different fixtures thereon for the welding of the next of the successive body structures to be welded.

3. A car body assembly system of the type having a welding station receiving a succession of differing body component parts to weld such components into integrated body structures of differing types, comprising:

a fixture frame having particular fixtures mounted thereon to clamp and locate the component parts of a particular one of the differing styles in predetermined position within the welding station, programmable welding robot means adapted to apply welds to the position component parts, a fixture changing station located remote from the welding station and having associated storage means storing additional fixtures adapted for mounting on the fixture frame for the clamping and locating of the component parts of additional one or more different types to be welded, transport means for moving the fixture frame between the welding station and the fixture changing station, disconnectable fixture holding means individually mounting said particular fixtures on the fixture frame and permitting removal of said particular fixtures from the fixture frame and permitting the mounting of different of the additional fixtures thereon for the subsequent clamping and locating of the body components for a body structure of differing type, and programmable fixture changing robot means adapted to individually disconnect said fixtures from the fixture frame and mount different fixtures thereon in preparation for the welding of the next of the successive body structures to be welded when the transport means moves the fixture frame back to the welding station.

4. A body assembly system of the type having a welding station receiving a succession of differing body component parts to weld such components into integrated body structures of differing types, comprising:

a fixture frame having fixtures mounted thereon and including sensors and motors of the electrical and fluid power type to clamp and locate the component parts in predetermined position within the welding station, programmable welding robot means adapted to apply welds in a predetermined manner to the particular component parts positioned within the welding station, transport means for moving the fixture frame away from the welding station, a plurality of disconnectable fixture holding means mounting said fixtures on the fixture frame and permitting removal of said fixtures from the fixture frame and permitting the mounting of different fixtures thereon for the subsequent clamping and locating of the body components for a body structure of differing type, each of said holding means having disconnectable electrical connectors and fluid power connectors adapted to made with mating connectors mounted on the fixture frame to communicate control and power signals between the fixture frame and the particular fixture mounted on the fixture frame, and programmable fixture changing robot means adapted to disconnect the fixture holding means and the associated connectors from the fixture frame and remove the fixtures and mount different fixtures thereon for the welding of the most of the successive body structures to be welded.

5. A method for welded assembly of a vehicle body in a welding station receiving a succession of differing body component parts to weld such components into integrated body structures of differing styles, comprising:

disconnectably mounting a first plurality of fixtures on a fixture frame, said fixtures being suited to clamp and locate the component parts of a particular body style in a predetermined position within the welding station, positioning the fixture frame in the welding station with the first plurality of fixtures clamping and locating the component parts, applying welds to the positioned component parts in the welding station, removing the fixture frame away from the welding station, robotically exchanging fixtures by disconnecting certain of the first plurality of fixtures from the fixture frame and installing certain other fixtures thereon, said other fixtures being suited to clamp and locate the component parts of a next body of different type to be welded in the welding station, and returning the fixture frame to the welding station.

* * * * *